(12) United States Patent
Tuchman

(10) Patent No.: US 6,407,873 B1
(45) Date of Patent: Jun. 18, 2002

(54) SAFETY SHUTTER

(75) Inventor: Israel Tuchman, Flushing, NY (US)

(73) Assignee: Electro-Optical Products Corp., Flushing, NY (US)

( * ) Notice: Subject to any disclaimer, the term of this patent is extended or adjusted under 35 U.S.C. 154(b) by 0 days.

(21) Appl. No.: 09/344,412

(22) Filed: Jun. 26, 1999

(51) Int. Cl.[7] .................... G02B 27/00; G21F 5/02; G21F 5/00; G03B 9/40
(52) U.S. Cl. ............... 359/894; 250/496.1; 250/506.1; 396/490; 396/484
(58) Field of Search ..................... 396/132, 133, 396/488, 183, 490, 484; 359/466, 894; 251/215, 187; 250/105, 496.1, 106, 506.1

(56) References Cited

U.S. PATENT DOCUMENTS

| | | | | |
|---|---|---|---|---|
| 3,697,755 A | * | 10/1972 | Boissevain et al. | 250/106 |
| 3,709,121 A | * | 1/1973 | Simonson et al. | 396/483 |
| 4,040,072 A | * | 8/1977 | Johnson et al. | 396/132 |
| 4,357,083 A | * | 11/1982 | Johnson et al. | 396/439 |
| 5,130,795 A | * | 7/1992 | Rusche et al. | 358/108 |
| 5,202,721 A | * | 4/1993 | Kobayashi et al. | 354/441 |
| 5,701,525 A | * | 12/1997 | Caterino et al. | 396/132 |
| 5,828,487 A | * | 10/1998 | Greening et al. | 359/466 |

* cited by examiner

Primary Examiner—Audrey Chang

(57) ABSTRACT

A safety shutter suitable for intercepting an energy beam. The safety shutter includes at least one shutter blade having a top end and a bottom end. At least one motor is coupled to the bottom end of the shutter blade such that the motor rotates the shutter blade from a closed position to an open position when energized. The shutter blade is coupled to at least one spring, wherein the spring rotates the shutter blade from the open position to the closed position when the motor is de-energized.

9 Claims, 4 Drawing Sheets

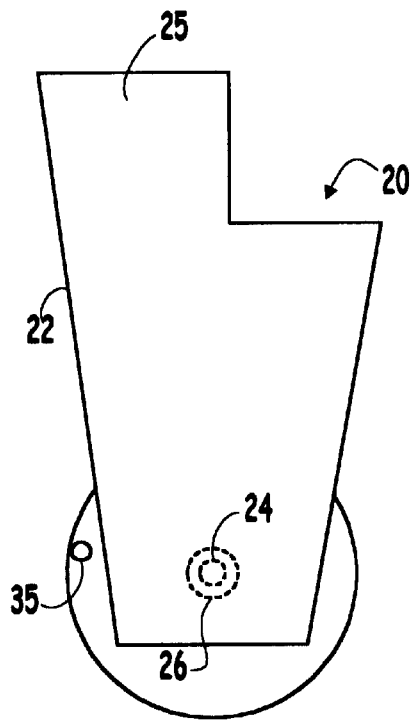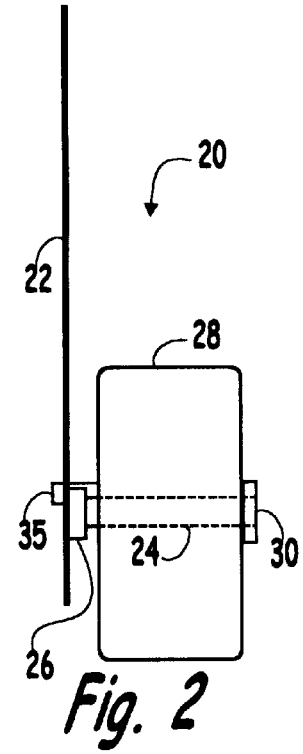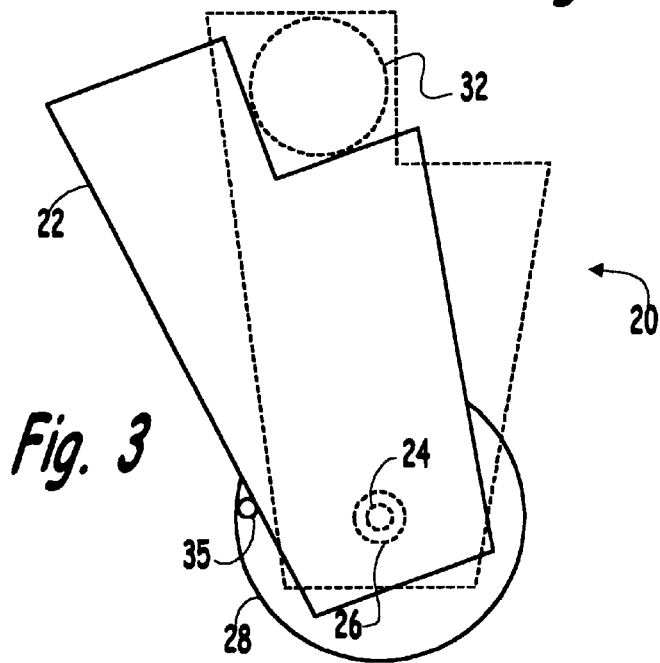

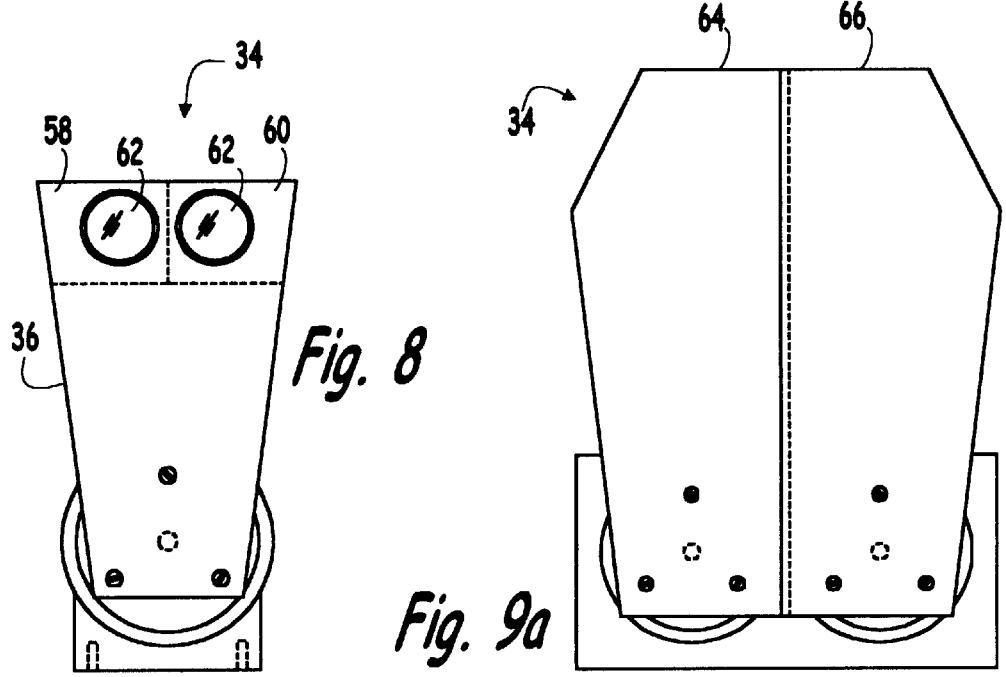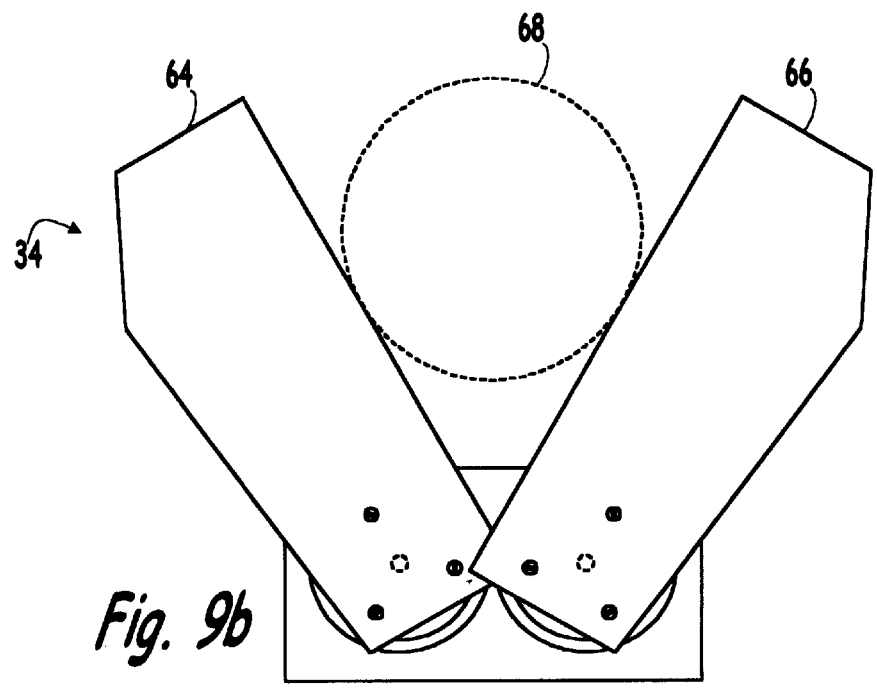

SAFETY SHUTTER

BACKGROUND OF THE INVENTION

1. Field of the Invention

The present invention relates to an optical and particle beam shutter, and more specifically to a shutter which moves to a closed position when it is de-energized.

2. Relevant Background

Many applications utilize a high energy laser beam or particle stream, herein referred to as an "energy beam", to carry out certain functions. For example, a high energy laser can be used to cut patterns in fabric during clothing production. In such applications, it is often necessary to quickly stop transmission of the energy beam when an event such as system failure occurs. For example, it is desirable to quickly switch off a laser used for fabric cutting if the laser positioning equipment loses power for some reason, since otherwise the laser beam may stay focused at the same spot for too long and potentially cause the fabric to catch fire.

The most direct method to quickly stop transmission of the energy beam, when possible, is to quickly switch off the power to the energy beam source. This method is not always possible since high energy beam sources often require too long of a period of time to switch off. In addition, high energy beam sources are often powered separately from the beam steering circuitry, and a power failure to the steering circuitry may not necessarily result in a power failure to the energy beam source. Another approach is to intercept the energy beam with an optical/beam shutter. Optical/beam shutters can be designed to absorb or reflect an energy beam and are also referred to as "interlock shutters", "optical modulators", or "optical choppers".

A popular optical shutter design is called a rotating optical shutter. A rotating shutter includes a disk with one or more notches or holes cut into it and is mounted on a motor shaft. When the disk is positioned such that the energy beam passes through one of the notches, the energy beam is unobstructed. To intercept the energy beam, the shutter disk is rotated to a position where the beam no longer passes through the notch and is therefore obstructed by the disk.

One drawback of the rotating shutter design is that power must be present at the shutter motor for the shutter disk to be rotated to a beam-obstructing position. If the rotating shutter loses power, the shutter disk cannot be rotated to an obstructing position and the energy beam will continue to pass through the shutter disk notch, possibly causing damage or injury.

Another optical shutter design utilizes a shutter blade which can be moved from a beam passing position to a beam obstructing position. This type of shutter design is disclosed in U.S. patent application Ser. No. 09/035,766 entitled, "Low Frequency Optical Shutter", U.S. Pat. No. 6,046,836. This shutter design suffers from the same drawback as the rotating shutter design, where power to the shutter must be present in order to switch the shutter blade to a beam-obstructing position.

There is a need therefore for a low power optical/beam shutter that can obstruct an energy beam quickly and wherein the shutter can switch to a beam-obstructing position when a power loss to the shutter occurs. This helps ensure that energy beam transmission is halted during a power failure to the beam steering equipment, averting possible damage or injury.

SUMMARY OF THE INVENTION

Briefly stated, the present invention teaches a safety shutter suitable for intercepting an energy beam. The safety shutter includes at least one shutter blade having a top end and a bottom end. At least one motor is coupled to the bottom end of the shutter blade such that the motor rotates the shutter blade from a closed position to an open position when energized. The shutter blade is coupled to at least one spring, wherein the spring rotates the shutter blade from the open position to the closed position when the motor is de-energized.

Variations of the present invention may be constructed. For example, the motor can be, but is not limited to, a solenoid, a stepper motor, or a DC motor. Likewise, the shutter blade can be made from reflective material or non-reflective material. The shutter blade may further include at least one optical filter, and the top end of the shutter blade may include a tabbed section. The spring may be a spiral spring, and the optical safety shutter may further include a base attached to the motor.

BRIEF DESCRIPTION OF THE DRAWINGS

FIG. 1 provides a simplified showing of a shutter that includes the present invention.

FIG. 2 shows a side view of the simplified shutter.

FIG. 3 shows the simplified shutter at an energized position.

FIG. 8 shows another embodiment of the shutter.

FIG. 9a and FIG. 9b show yet another embodiment of the present invention.

DETAILED DESCRIPTION OF THE PREFERRED EMBODIMENTS

Figure 4:
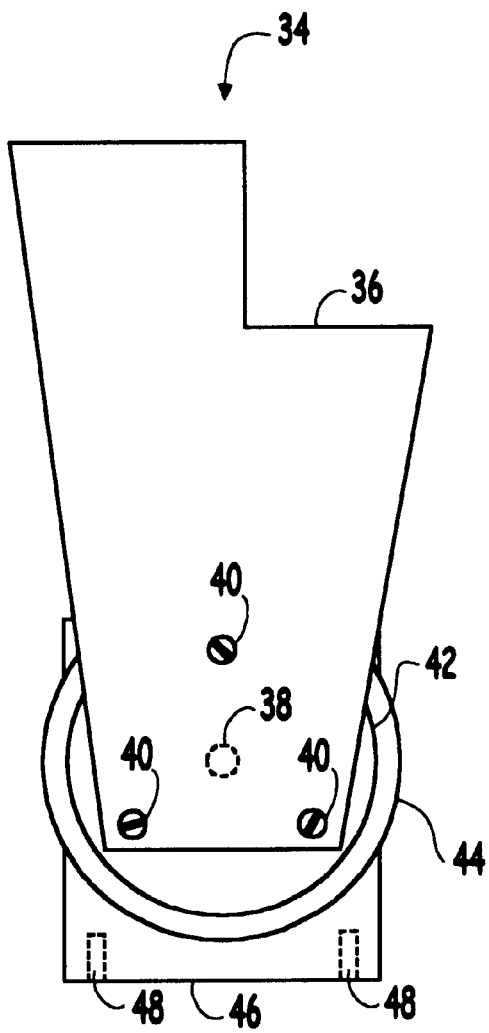
FIG. 4 shows a front view of another embodiment of the present invention.

FIG. 1 provides a simplified showing of a shutter 20 that includes the present invention. In this figure, a shutter blade 22 is coupled to a motor shaft 24. The shutter blade 22 is substantially rectangular in shape, with an upper side region cut away, forming an tabbed upper portion 25. The shutter blade 22 can engage the motor shaft 24 directly using solder or an adhesive such as epoxy, or the shutter blade 22 may engage the motor shaft 24 indirectly using a mounting bracket 26 as shown. A motor 28 driving the shaft 24 may be a DC motor, AC motor, stepper motor or other device capable of rotary motion.

FIG. 2 shows a side view of the shutter 20. A spring 30 is attached to the motor shaft 24, thereby biasing the shutter blade 22 to a de-energized position shown in FIG. 1. Thus, when the motor 28 is powered off, the biasing force of the spring 30 moves the shutter blade 22 to the de-energized position. The spring construction may include a coil spring, a hair spring, an elliptic spring, or preferably a spiral spring. The spring 30 may alternatively be attached directly to the shutter blade 22 or another component of the shutter which is responsive to the rotational force of the motor 28.

In FIG. 3, the shutter 20 is shown with the shutter blade 22 at an energized position. At this position, the motor 28 exerts enough force to overcome the biasing force of the spring 30. A target region 32, normally obstructed when the shutter is in the de-energized position, is unobstructed when the shutter is moved to the energized position. Thus, an energy beam traveling normal to the shutter blade surface and focused at the target region 32 can only travel past the shutter blade 22 when the shutter blade 22 is at the energized position, and is blocked when the shutter blade 22 is in the de-energized position. The shutter blade's rotational motion may be limited using a mechanical stop 35 which physically prevents the shutter blade from traveling a complete revolution.

FIG. 4 shows a front view of another embodiment of the present invention. A safety shutter 34 includes a shutter blade 36 coupled to a shaft 38. Preferably, the shutter blade 36 is mounted with screws 40 to a rotating plate 42 which is connected to the shaft 38. A solenoid 44 is used to rotate the shutter blade 36 over a limited angular range from a de-energized ("closed") position to an energized ("open") position. The solenoid 44 is attached to a base 46 having tapped cavities 48 which allow for horizontal and vertical mounting of the safety shutter 34.

Figure 5:
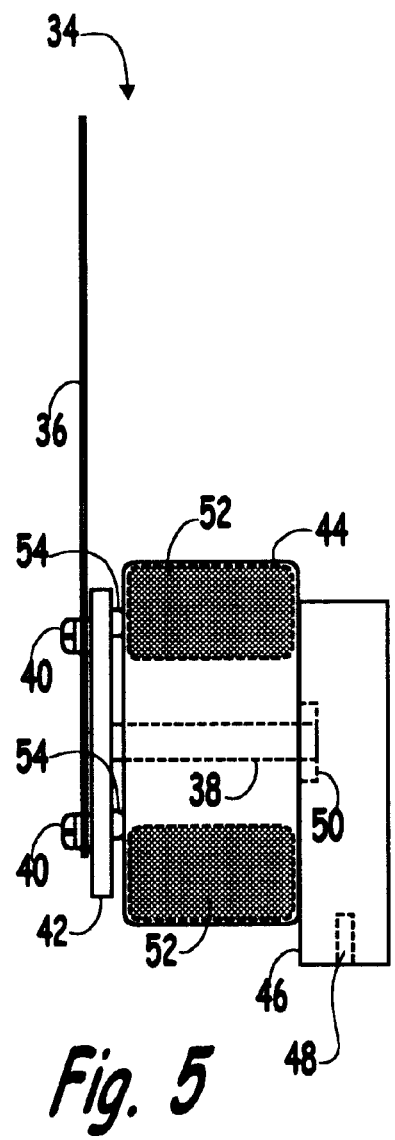
FIG. 5 shows a side view of the shutter as contemplate by the present invention.

FIG. 5 shows a side view of the safety shutter 34. A spring 50 is connected to the shaft 38 which creates a biasing force when the shaft 38 is rotated. The solenoid 44 includes a wire coil 52 which creates an electrically induced magnetic force when the coil 52 is energized with electric current. Rotational motion is achieved using spiral grooves of gradating depth stamped into the solenoid casing and ball bearings 54 placed within the spiral grooves. When the rotating plate 42 is pulled towards the solenoid by the electrically induced magnetic force of the coil 52, the rotating plate 42 turns as the ball bearings 54 travel along the spiral grooves.

Figure 6:
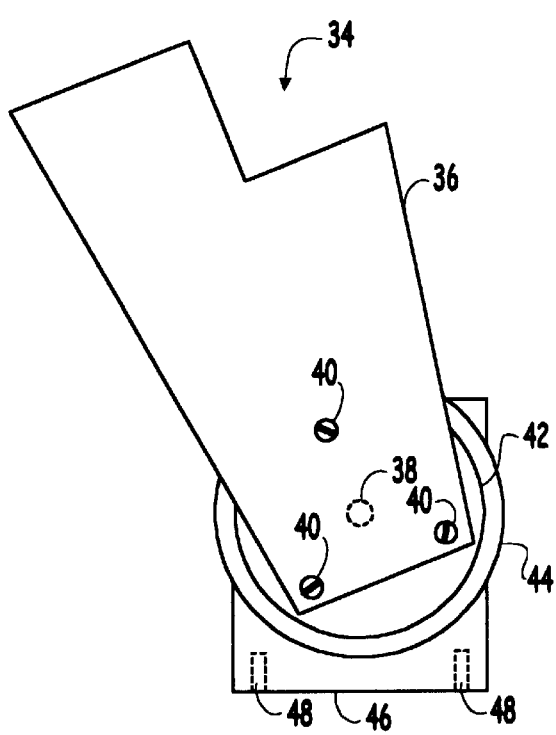
FIG. 6 shows the shutter in an open position.
Figure 7:
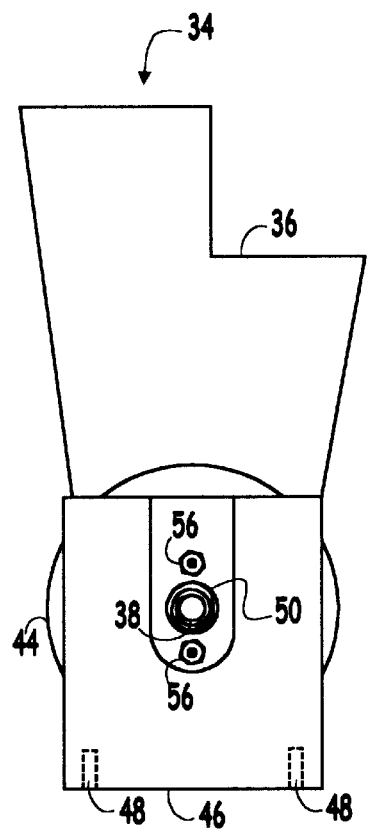
FIG. 7 shows a rear view of the shutter.

FIG. 6 shows the safety shutter 34 in the open position. As mentioned above, an electric current passing through the coil 52 creates a magnetic force, pulling the rotating plate 42 towards the solenoid 44. The open position is the point of linear travel where the rotating plate 42 is physically prevented from moving closer to the solenoid 44. It is contemplated that electric current to the coil 52 may be reduced as the rotating plate 42 reaches the open position. FIG. 7 is a rear view of the safety shutter 34 showing the solenoid 44 secured to the base 46 with a set of mounting nuts 56.

In FIG. 8, another embodiment of the safety shutter 34 is shown. The top end of the shutter blade 36 is partitioned into an first section 58 and a second section 60. It is contemplated that the first section 58 has different optical properties than the second section 60. For example, the first section 58 may be reflective and the second section 60 may be non-reflective. In addition, each section may contain optical filters 62 capable of passing a subset of wavelengths in the electromagnetic spectrum.

Yet another embodiment of the present invention is shown in FIG. 9a and FIG. 9b. The safety shutter 34 includes a first shutter blade 64 and a second shutter blade 66. In the closed position, shown in FIG. 9a, the second shutter blade 66 overlaps the first shutter blade 64. In the open position, shown in FIG. 9b, both shutter blades 64 and 66 are rotated opposite each other. This configuration allows the safety shutter 34 to open and close a greater target area 68. It is contemplated that additional shutter blades may be added to further increase the target area 68.

It is contemplated that the safety shutter of the present invention can be incorporated into a beam steering assembly, with the safety shutter positioned before the energy beam source. The safety shutter can be powered by the same power source of the other beam steering components such that when a power failure to the beam steering components occurs, power failure to the safety shutter also occurs. Such a power failure will cause the shutter blade to spring to the closed position, ensuring the energy beam is blocked from further transmission.

Although the invention has been described and illustrated with a certain degree of particularity, it is understood that the present disclosure has been made only by way of example, and that numerous changes, combinations and arrangements of techniques can be resorted to by those skilled in the art without departing from the spirit and scope of the invention, as hereinafter claimed.

What is claimed is:

1. A safety shutter suitable for intercepting an energy beam, the safety shutter comprising:

a first shutter blade having a top end and a bottom end;

a second shutter blade having a top end and a bottom end;

a first motor coupled with the bottom end of the first shutter blade, the first motor rotating the first shutter blade in a clockwise direction when the shutter is energized;

a second motor proximate the first motor and coupled with the bottom end of the second shutter blade, the second motor rotating the second shutter blade in a counterclockwise direction when the shutter is energized such that an aperture is formed between the first shutter blade and the second shutter blade when the shutter is energized;

a first spring coupled with the first shutter blade, wherein the first spring rotates the first shutter blade in a counterclockwise direction when the shutter is de-energized; and a second spring coupled with the second shutter blade, wherein the second spring rotates the second shutter blade in a clockwise direction when the shutter is de-energized such that the aperture is closed when the shutter is de-energized.

2. The safety shutter of claim 1, wherein in the first motor and the second motor are stepper motors.

3. The safety shutter of claim 1, wherein in the first motor and the second motor are DC motors.

4. The safety shutter of claim 1, wherein in the first motor and the second motor are solenoids.

5. The safety shutter of claim 4, further comprising:

a first shaft within the first motor;

a first rotating plate coupled with the first shaft, wherein the first shutter blade is secured to the first rotating plate;

a second shaft within the second motor; and a second rotating plate coupled with the second shaft, wherein the second shutter blade is secured to the second rotating plate.

6. The safety shutter of claim 1, wherein in the first shutter blade and the second shutter blade are reflective.

7. The safety shutter of claim 1, wherein in the first shutter blade and the second shutter blade are non-reflective.

8. The safety shutter of claim 1, wherein in the first spring and the second spring are spiral springs.

9. The safety shutter of claim 1, further comprising:

a first mechanical stop, wherein the first mechanical stop prevents the first shutter blade from traveling a complete rotational revolution; and a second mechanical stop, wherein the second mechanical stop prevents the second shutter blade from traveling a complete rotational revolution.

* * * * *